(12) United States Patent
Voo

(10) Patent No.: US 8,736,999 B1
(45) Date of Patent: May 27, 2014

(54) METHOD AND APPARATUS FOR COMMON BASE AMPLIFIER RECOVERY

(75) Inventor: Thart Fah Voo, Singapore (SG)

(73) Assignee: Marvell International Ltd., Hamilton (BM)

( * ) Notice: Subject to any disclaimer, the term of this patent is extended or adjusted under 35 U.S.C. 154(b) by 111 days.

(21) Appl. No.: 13/325,756

(22) Filed: Dec. 14, 2011

Related U.S. Application Data (60) Provisional application No. 61/427,007, filed on Dec. 23, 2010, provisional application No. 61/486,474, filed on May 16, 2011.

(51) Int. Cl.
*G11B 5/02* (2006.01)

(52) U.S. Cl.
USPC .............................................. 360/46; 360/67

(58) Field of Classification Search
None
See application file for complete search history.

(56) References Cited

U.S. PATENT DOCUMENTS 6,633,446 B1 * 10/2003 Sako .............................. 360/67

* cited by examiner

*Primary Examiner* — Wayne Young
*Assistant Examiner* — Brian Butcher (57) ABSTRACT

Aspects of the disclosure provide a circuit. The circuit includes a biasing circuit and an amplifier. The biasing circuit is configured to generate a bias voltage and a bias current based on a first resistor having a first resistance determined based on a second resistor. The amplifier is biased based on the bias voltage and bias current to generate an electrical signal that varies in response to a resistance change of the second resistor.

20 Claims, 7 Drawing Sheets

METHOD AND APPARATUS FOR COMMON BASE AMPLIFIER RECOVERY

INCORPORATION BY REFERENCE

This application claims the benefit of U.S. Provisional Application No. 61/427,007, "Common Base Wideband Amplifier with Very Fast Recovery Without Continuous Feedback Loop" filed on Dec. 23, 2010, and U.S. Provisional Application No. 61/486,474, "Method and Apparatus MR Measurement" filed on May 16, 2011, which are incorporated herein by reference in their entirety.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Generally, a hard disk drive (HDD) system includes a read element, such as a magneto resistive (MR) element, to sense magnetic fields corresponding to data stored on one or more hard drive platters. Further, the HDD system includes an amplifier that amplifies low level signals from the read element and outputs the amplified signal to a read channel to extract the data.

SUMMARY

Aspects of the disclosure provide a circuit. The circuit includes a biasing circuit and an amplifier. The biasing circuit is configured to generate a bias voltage and a bias current based on a first resistor having a first resistance determined based on a second resistor. The amplifier is biased based on the bias voltage and bias current to generate an electrical signal that varies in response to a resistance change of the second resistor.

In an embodiment, the biasing circuit includes a bias voltage generator configured to generate the bias voltage based on a user input, and a bias current generator configured to generate the bias current based on the bias voltage and the first resistor. In another embodiment, the biasing circuit includes a bias current generator configured to generate the bias current based on a user input, and a bias voltage generator configured to generate the bias voltage based on the bias current and the first resistor.

According to an embodiment of the disclosure, the first resistor is programmable. The circuit includes a calibration circuit to be switched on in a calibration mode to determine the first resistance based on the electrical signal. The biasing circuit is configured to generate at least one of the bias voltage based on a voltage drop on the first resistor, and the bias current based on a current flowing through the first resistor. In an example, the first resistor is re-programmable, and the calibration circuit is configured to program the first resistor based on the electrical signal.

According to an aspect of the disclosure, the circuit is implemented on an integrated circuit, and the second resistor is external to the integrated circuit. Further, in an example, the circuit includes a memory configured to store an error correction value, and the biasing circuit is configured to generate the bias voltage and the bias current based on the first resistor and the error correction value.

In an embodiment, the amplifier is a differential common base amplifier.

Aspects of the disclosure provide a method. The method includes generating a bias voltage and a bias current based on a first resistor having a first resistance determined based on a second resistor, biasing an amplifier based on the bias voltage and bias current, and generating an electrical signal that varies a voltage in response to a resistance change of the second resistor.

Aspects of the disclosure provide a hard disk drive system. The hard disk drive system includes a magneto resistive sensor configured to have a resistance that varies in response to a magnetic field. Further the hard disk drive system includes a circuit having a biasing circuit and an amplifier. The biasing circuit is configured to generate a bias voltage and a bias current based on an internal resistor calibrated to match the resistance of the magneto resistive sensor. The amplifier is biased based on the bias voltage and the bias current to generate an electrical signal that varies in response to the resistance change of the magneto resistive sensor.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION OF EMBODIMENTS

Figure 1:
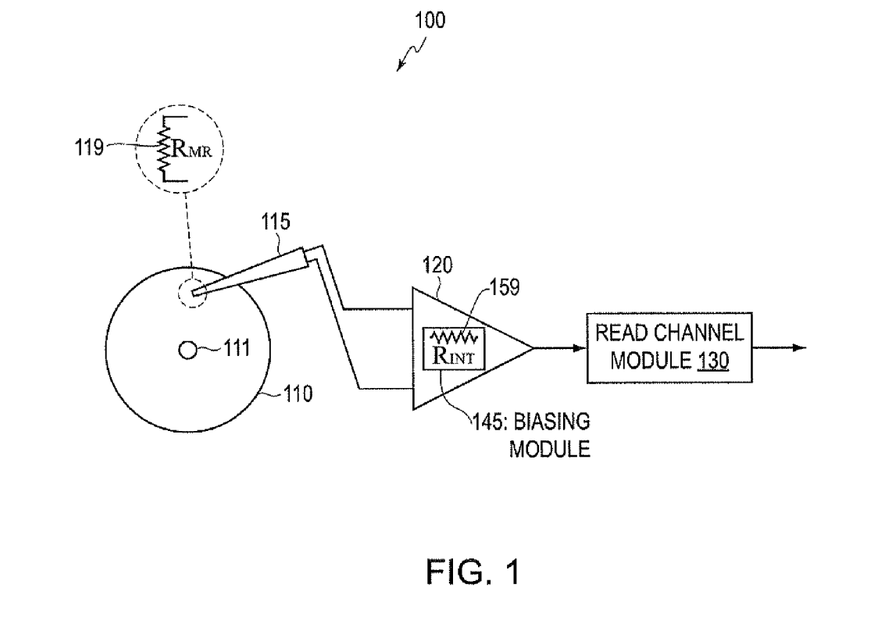
FIG. 1 shows a diagram of a system example 100 according to an embodiment of the disclosure.

FIG. 1 shows a diagram of a system example 100 according to an embodiment of the disclosure. The system 100 includes an amplifier circuit that generates an electrical signal in response to a resistance change of a resistive sensor, and a biasing circuit that biases the amplifier circuit based on a resistor that is pre-calibrated based on the resistive sensor.

Specifically, in the FIG. 1 example, the system 100 is a hard disk drive (HDD) system 100. The HDD system 100 includes one or more hard drive platters 110 that include magnetic coatings to store magnetic fields, an arm 115 with a read element, such as a magneto resistive sensor ($R_{MR}$) 119, located at a distal end of the arm 115, a pre-amplifier 120 configured to generate an electrical signal corresponding to sensed magnetic field change by the magneto resistive sensor 119, and a read channel module 130 configured to process the electrical signal. These elements are coupled together as shown in FIG. 1.

According to an aspect of the disclosure, data is stored on the hard drive platters 110 as magnetic fields. The $R_{MR}$ 119 operates similarly to a resistor and has a resistance that varies in response to a magnetic field around the $R_{MR}$ 119. The pre-amplifier 120 includes a biasing module 145 to provide suitable bias voltage and bias current to the pre-amplifier 120, such that the pre-amplifier 120 is biased at an operation condition that is sensitive to the resistance change of the $R_{MR}$ 119. According to an embodiment of the disclosure, the biasing module 145 includes a resistor, such as an internal resistor ($R_{INT}$) 159, having a resistance that is pre-calibrated based on the $R_{MR}$ 119. In an example, the resistance of the $R_{INT}$ 159 is calibrated to be about the same as the $R_{MR}$ 119 under zero magnetic field. During a read operation, in an example, a bias voltage and a bias current are generated based on the $R_{INT}$ 159 to suitably bias the pre-amplifier 120, such that the pre-amplifier 120 generates an electrical signal having a specific value, such as zero volt, when the $R_{MR}$ 119 is not affected by any magnetic field. Then, when the $R_{MR}$ 119 is in a close proximity to the hard drive platters 110, the resistance of the $R_{MR}$ 119 is affected by the magnetic fields on the hard drive platters 110, and then the resistance change causes the electrical signal generated by the pre-amplifier 120 to shift from the specific value.

The read channel module 130 further processes the electrical signal to extract the data. The read channel module 130 includes any suitable modules (not shown) to process the electrical signal. In an example, the read channel module 130 includes an offset adjustment module, a variable gain amplifier (VGA), a continuous time filter (CTF), an analog to digital converter (ADC), an equalizer, and a decoder. For example, the offset adjustment module adjusts the offset of the electrical signal, the VGA amplifies the electrical signal with a gain that is adjustable, and provides the amplified electrical signal to the CTF. The CTF filters the amplified electrical signal to remove high frequency noise to clean the electrical signal, and provides the filtered electrical signal to the ADC. The ADC samples the electrical signal according to a sampling clock, converts the samples of the electrical signal from an analog form to a digital form, and provides digital signal to the equalizer. The equalizer receives the digital signal, and shapes the digital signal. Then, the decoder extracts the bit stream from the shaped digital signal.

According to an embodiment of the disclosure, the $R_{MR}$ 119 and the pre-amplifier 120 are configured in a sleep mode when the HDD system 100 is in a write state, and are switched to a normal operation mode when the HDD system 100 switches to a read state. In an example, the HDD system 100 includes a separate write element from the read element. For example, the HDD system 100 includes a thin-film inductor located in a close proximity to the $R_{MR}$ 119 at the distal end of the arm 115. During the write operation, an electrical current that flows through the thin film inductor is switched to produce a magnetic field having a positive or negative polarity. The positive or the negative polarity is then stored on the hard drive platters 110 to represent data. During the write operation, the $R_{MR}$ 119 and the pre-amplifier 120 are configured to stay in the sleep mode that a power supply to the $R_{MR}$ 119 and the pre-amplifier 120 is switched off to save energy.

When the HDD system 100 switches from the write state to the read state, the power supply to the $R_{MR}$ 119 and the pre-amplifier 120 is switched on, the bias voltage and the bias current to the pre-amplifier 120 are generated based on the $R_{INT}$ 159, and does not fully rely on a feedback loop to gradually adjust the bias current and/or the bias voltage to the appropriate level. Thus, the pre-amplifier 120 recovers to the biased operation condition quickly, and the HDD system 100 can start the read operation quickly.

It is noted that, in an embodiment, the pre-amplifier 120 uses a feedback loop to perform minor adjustment to the bias current and/or the bias voltage, or uses a feedback loop to calibrate the $R_{INT}$ 159.

Figure 2:
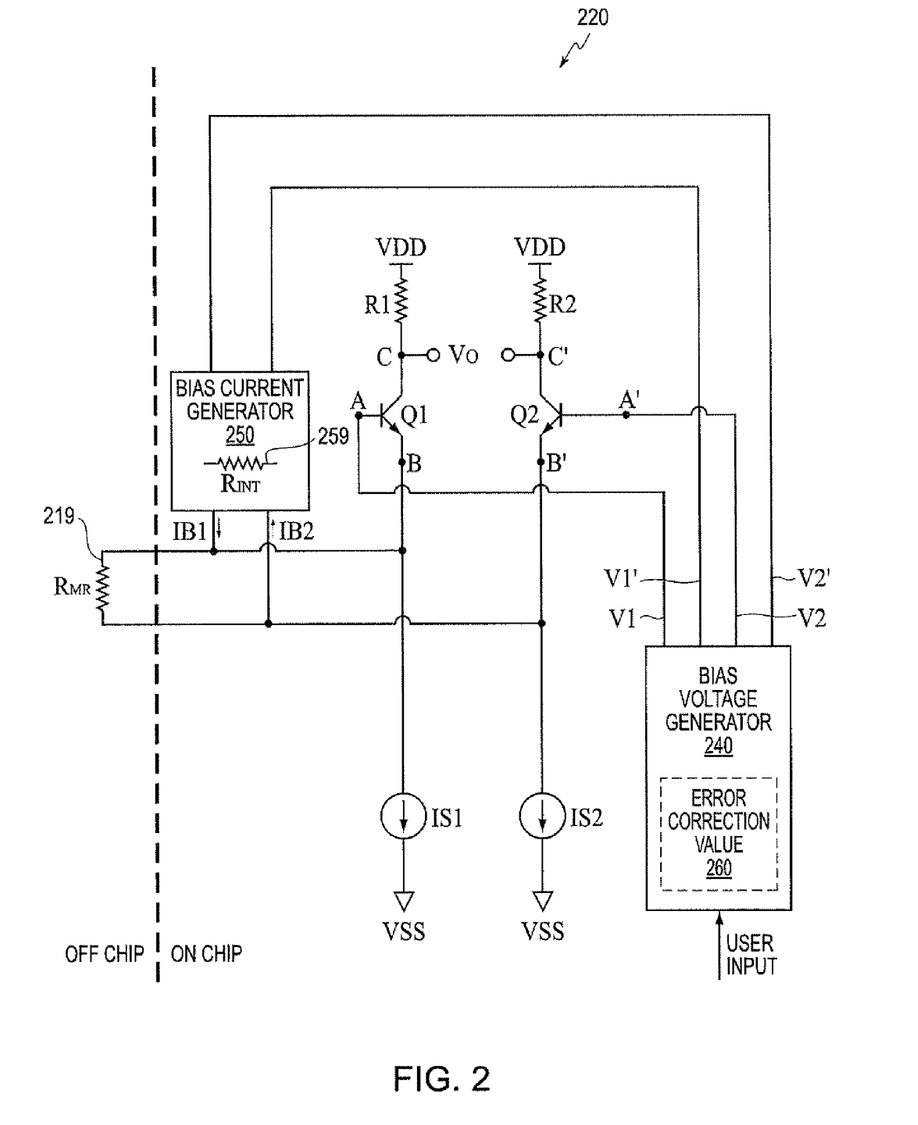
FIG. 2 shows a diagram of a pre-amplifier example 220 according to an embodiment of the disclosure.

FIG. 2 shows a diagram of a pre-amplifier example 220 coupled with a magneto resistive sensor ($R_{MR}$) 219 according to an embodiment of the disclosure. The pre-amplifier 220 is implemented on an integrated circuit (IC) chip, and the $R_{MR}$ 219 is off the IC chip, and is suitably coupled with the pre-amplifier 220. In an embodiment, the pre-amplifier 220 is integrated with other circuits, such as analog circuit, digital circuit, and the like, for further processing an electrical signal generated by the pre-amplifier 220 on one or more IC chips.

The pre-amplifier 220 includes an amplifier portion and a biasing portion. In the FIG. 2 example, the amplifier portion includes two bipolar-type transistors Q1 and Q2, two resistors R1 and R2 and two current sources IS1 and IS2 coupled together in a differential common base amplifier configuration. The biasing portion includes a bias voltage generator 240 to generate and provide bias voltages to the amplifier portion, and a bias current generator 250 to generate and provide bias currents to the amplifier portion. These elements are coupled together as shown in FIG. 2.

Specifically, the transistor Q1 has its base coupled to node A, its emitter coupled to node B, and its collector coupled to node C, and transistor Q2 has its base coupled to node A', its emitter coupled to node B', and its collector coupled to node C'. The resistor R1 is coupled between the power supply VDD and node C. The current source IS1 is coupled between node B and the power supply VSS. The bias voltage generator 240 provides a voltage V1 to node A. The resistor R2 is coupled between node C' and the power supply VDD. The current source IS2 is coupled between node B' and the power supply VSS. The bias voltage generator 240 provides a voltage V2 to node A'. The $R_{MR}$ 219 is coupled between node B and node B'. The bias current generator 250 drives a first current IB1 into node B and drives a second current IB2 out of node B'.

According to an aspect of the disclosure, the bias voltage generator 240 and the bias current generator 250 provides the bias voltages V1 and V2 and the bias currents IB1 and IB2 based on an internal resistor $R_{INT}$ 259 that is pre-calibrated based on the $R_{MR}$ 219. In an example, the $R_{INT}$ 259 has about the same resistance value as the $R_{MR}$ 219 under zero magnetic field. In another example, the resistance of the $R_{INT}$ 259 is suitably scaled up from the resistance of the $R_{MR}$ 219 under zero magnetic field.

In an example, the bias voltages V1 and V2 and the bias currents IB1 and IB2 satisfy Eq. 1:

$$IB1 = IB2 = \frac{V1 - V2}{R_{INT}}. \qquad \text{Eq. 1}$$

Because the voltage drop from node A to node B is about the same as the voltage drop from node A' to node B', then a voltage (V1-V2) is applied to the $R_{MR}$ 219. Then, due to the reason that the $R_{MR}$ 219 has about the same resistance as the $R_{INT}$ 259, a current flowing through the $R_{MR}$ 219 from node B to node B' is about the same as IB1 and IB2. Further, because the bias current provider 250 drives the bias current IB1 into the node B and drives the bias current IB2 out of the node B', the current flowing through the transistors Q1 and Q2 are the current provided by the current sources IS1 and IS2. In an embodiment, the current sources IS1 and IS2 provide about the same current respectively to nodes B and B'. Then, about the same amount of current respectively flows through the transistor Q1 and Q2, and flows through the resistors R1 and R2. When the resistors R1 and R2 have about the same resistance, a voltage (Vo) between the node C and node C' is about zero.

When the resistance of the $R_{MR}$ 219 is affected by a magnetic field, the voltage between the node C and node C' shifts from zero. For example, when the resistance of the $R_{MR}$ 219 increases due to a magnetic field, the current flowing through the $R_{MR}$ 219 from node B to node B' is smaller than IB1 and IB2. Further, because the bias current provider 250 drives the bias current IB1 into the node B and drives the bias current IB2 out of the node B', the current flowing through the transistor Q1 is smaller than the current flowing through the transistor Q2. Then, the current flowing through the resistor R1 is smaller than the current flowing through the resistor R2, and thus the voltage Vo between the node C and node C' is larger than zero.

When the resistance of the $R_{MR}$ 219 decreases due to a magnetic field, the current flowing through the $R_{MR}$ 219 from node B to node B' is larger than IB1 and IB2. Further, because the bias current provider 250 drives the bias current IB1 into the node B and drives the bias current IB2 out of the node B', the current flowing through the transistor Q1 is larger than the current flowing through the transistor Q2. Then, the current flowing through the resistor R1 is larger than the current flowing through the resistor R2, and thus the voltage Vo between the node C and node C' is smaller than zero.

Then, when the resistance of the $R_{MR}$ 219 changes in response to magnetic fields on a hard drive platter, the voltage Vo between node C and node C' also changes. The voltage signal Vo can be further processed to extract data stored in the form of magnetic fields on the hard drive platter.

It is noted that, in an embodiment, the bias voltages and bias currents are provided in response to a user input. In the FIG. 2 example, the user input to the pre-amplifier 220 is in a digital form, and corresponds to a difference between the bias voltage V1 and V2. The bias voltage generator 240 generates the bias voltages V1 and V2 based on the user input. It is noted that the bias voltage generator 240 also provides bias voltages V1' and V2' to the bias current generator 250. The bias voltages V1' and V2' can be the same as the bias voltages V1 and V2 or can be different from the bias voltages V1 and V2. The bias current generator 250 includes the $R_{INT}$ 259 and receives the bias voltages V1' and V2'. Then, the bias current generator 250 generates the bias currents IB1 and IB2 based on the $R_{INT}$ 259 and the bias voltages V1' and V2'.

According to another aspect of the disclosure, the biasing module includes an error correction value stored in a memory 260. The error correction value can be suitably calibrated and used to correct biasing errors. In an embodiment, the $R_{INT}$ 259 does not have exactly the same resistance as the resistance of the $R_{MR}$ 219 under zero magnetic field. Thus, when the bias voltages V1 and V2 and the bias currents IB1 and IB2 are generated based on the $R_{INT}$ 259 without correction, the voltage Vo is not balanced at zero when the $R_{MR}$ 219 is under zero magnetic field. It is noted that the pre-amplifier 220 may have other errors, such as mismatching errors, and the like, and the error correction value can be suitably determined to correct those errors.

According to an embodiment of the disclosure, the error correction value can be suitably determined and stored in the memory 260. The bias voltage generator 240 generates the bias voltages V1 and V2 based on the user input, and generates the bias voltages V1' and V2' based on the user input and the error correction value 260. Then, the bias current generator 250 generates the bias currents IB1 and IB2 based on the bias voltages V1' and V2' and the $R_{INT}$ 259, such that the voltage Vo is balanced at substantially zero when the $R_{MR}$ 219 is under zero magnetic field.

For example, when the resistance of the $R_{INT}$ 259 is larger than the resistance of the $R_{MR}$ 219 under zero magnetic field, the error correction value stored in the memory 260 is used to make the bias voltages V1' and V2' to have a larger difference than the bias voltages V1 and V2, and then the bias current IB1 and IB2 have larger value compared to no error correction.

It is noted that the bias voltage generator 240 and the bias current generator 250 can use any suitable technique to generate the bias voltages and the bias currents. In an example, the bias voltage generator 240 includes a digital to analog converter configured to convert a digital user input to a voltage level.

It is also noted that the pre-amplifier 220 can be suitably modified to use different circuit components. In an example, the bipolar transistors Q1 and Q2 can be replaced with other suitable transistors, such as metal-oxide-semiconductor (MOS) transistors, and the like. In another example, the resistors R1 and R2 can be replaced with MOS transistor loads.

Figure 3:
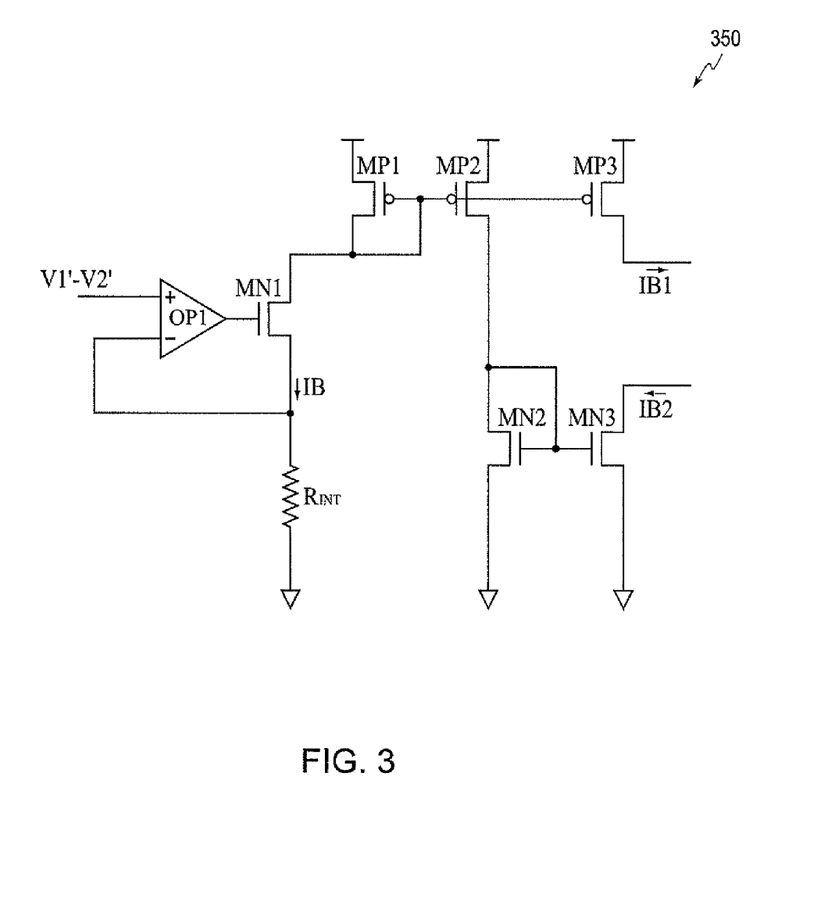
FIG. 3 shows a circuit diagram of a bias current generator example 350 according to an embodiment of the disclosure.

FIG. 3 shows a circuit diagram of a bias current generator example 350 according to an embodiment of the disclosure. The bias current generator 350 can be used in the pre-amplifier 220 as the bias current generator 250. The bias current generator 350 includes an operational amplifier OP1, three N-type metal-oxide-semiconductor (NMOS) transistors MN1-MN3, three P-type metal-oxide-semiconductor (PMOS) transistors MP1-MP3, and an internal resistor $R_{INT}$ that is pre-calibrated based on a resistance of the $R_{MR}$ 219. These elements are coupled together as shown in FIG. 3.

Specifically, the operational amplifier OP1, the resistor $R_{INT}$, and the transistors MP1 and MN1 are coupled as a transducer to convert a bias voltage (V1'-V2') to a bias current (IB) flowing through transistors MP1, MN1 and the resistor $R_{INT}$. The bias current IB satisfies Eq. 2.

$$IB = \frac{V1' - V2'}{R_{INT}} \qquad \text{Eq. 2}$$

The transistors MP2 and MP3 are gate-coupled to the transistor MP1 as current mirrors. The transistor MN2 and the transistor MP2 are serially coupled together to allow the same amount of current flowing through. The transistor MN3 is gate-coupled to the transistor MN2 as a current mirror.

In an embodiment, the transistors MP1-MP3 are configured to have the same width to length ratio, and the transistors MN2 and MN3 are configured to have the same width to length ratio. Thus, the current IB1 driven by the PMOS transistor MP3 has the same value as the current IB flowing through the PMOS transistor MP1. Similarly, the current IB2 driven by the NMOS transistor MN3 has the same value as the current flowing through the transistor MN2, which has the same value as the current flowing through the transistor MP2, and which has the same value as the current IB flowing through the PMOS transistor MP1. Then, the bias currents IB1 and IB2 satisfy Eq. 3.

$$IB1 = IB2 = IB = \frac{V1' - V2'}{R_{INT}} \qquad \text{Eq. 3}$$

In another embodiment, the internal resistor $R_{INT}$ is pre-calibrated to have N (N is a positive number) times the resistance of the $R_{MR}$ 219, the transistors MP1 and MP2 are configured to have the same width to length ratio of $W_P/L_P$, and the transistor MP3 is configured to have a width to length ratio of $N \times W_P/L_P$. The transistor MN2 is configured to have a width to length ratio of $W_N/L_N$, and the transistor MN3 is configured to have a width to length ratio of $N \times W_N/L_N$. Thus, the current IB1 driven by the PMOS transistor MP3 is equal to N×IB. Similarly, the current IB2 driven by the NMOS transistor MN3 is equal to N×IB. Thus, the bias currents IB1 and IB2 satisfy Eq. 4.

$$IB1 = IB2 = N \times IB = N \times \frac{V1' - V2'}{R_{INT}} \qquad \text{Eq. 4}$$

In this embodiment, the bias current generator 350 consumes less power.

It is noted that the bias current generator 350 can be suitably modified to use different circuit components. In an example, the MOS transistors MN1-MN3 and MP1-MP3 can be replaced with other suitable transistors, such as bipolar transistors, and the like.

Figure 4:
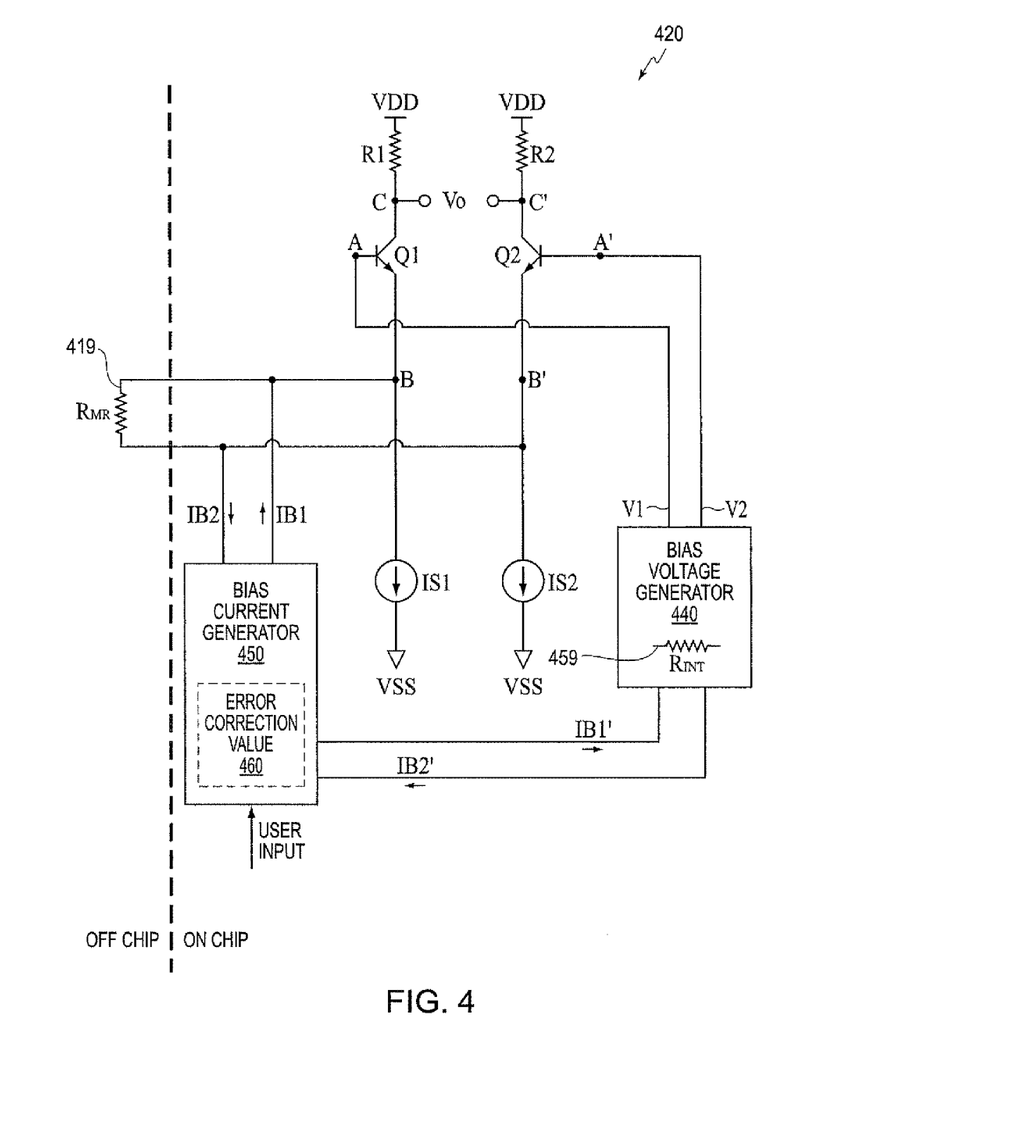
FIG. 4 shows another diagram of a pre-amplifier example 420 according to an embodiment of the disclosure.

FIG. 4 shows a diagram of a pre-amplifier example 420 coupled with a magneto resistive sensor ($R_{MR}$) 419 according to an embodiment of the disclosure. The pre-amplifier 420 utilizes certain components that are identical or equivalent to those used in the pre-amplifier 220; the description of these components has been provided above and will be omitted here for clarity purposes. In the FIG. 4 example, the user input to the pre-amplifier 420 is in a digital form, and corresponds to the bias currents IB1 and IB2. The bias current generator 450 generates the bias currents IB1 and IB2 based on the user input. Further, the bias current generator 450 generates bias currents IB1' and IB2' based on the user input and an error correction value stored in a memory 460. In an example, when error correction is not performed, the bias currents IB1' and IB2' are the same as the bias current IB1 and IB2. Then, the bias voltage generator 440 generates the bias voltage V1 and V2 based on the $R_{INT}$ 459 and the bias currents IB1' and IB2'.

Figure 5:
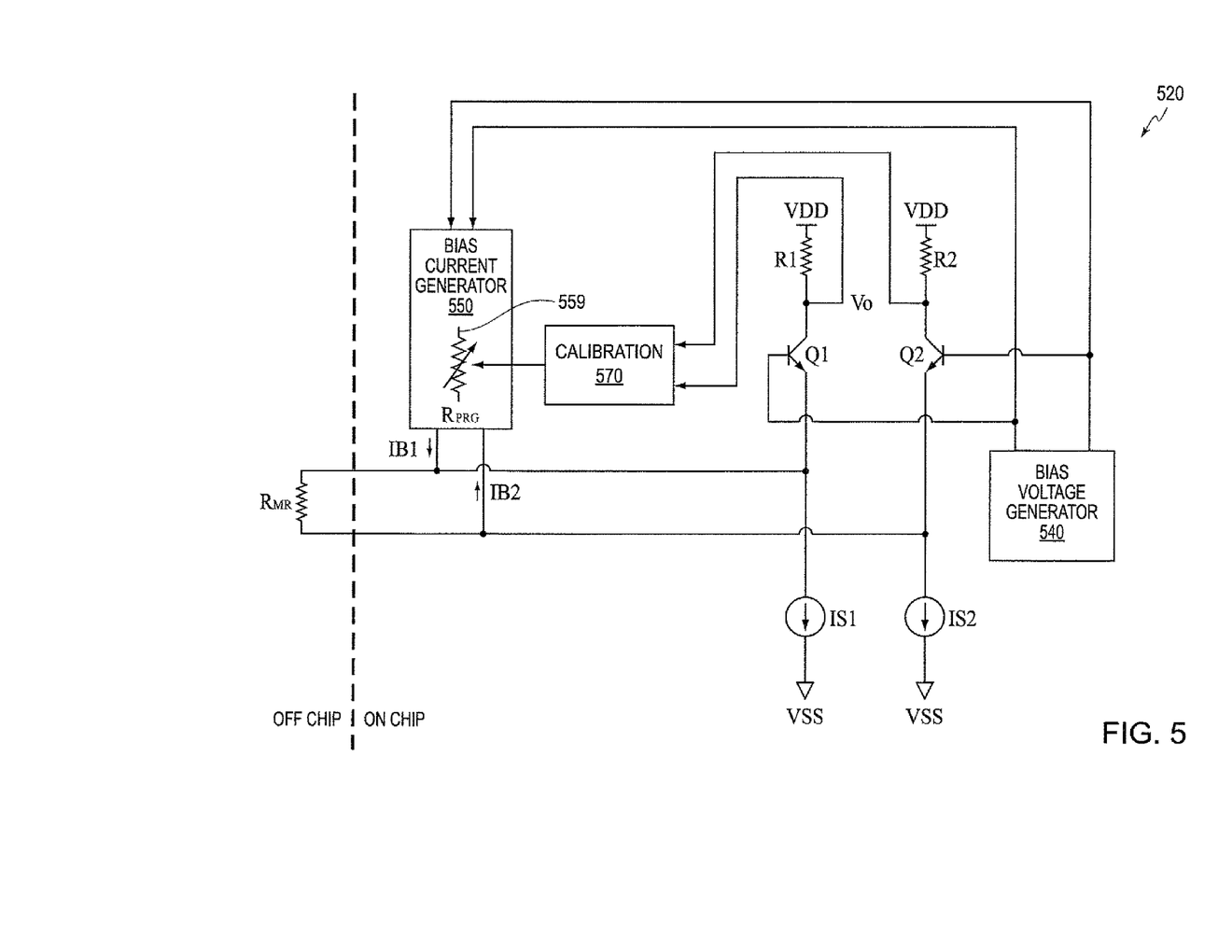
FIG. 5 shows another diagram of a pre-amplifier example 520 in a calibration mode according to an embodiment of the disclosure.

FIG. 5 shows a diagram of a pre-amplifier example 520 in a calibration mode according to an embodiment of the disclosure. The pre-amplifier 520 utilizes certain components that are identical or equivalent to those used in the pre-amplifier 220; the description of these components has been provided above and will be omitted here for clarity purposes. In the FIG. 5 example, the pre-amplifier 520 includes a calibration module 570 that can be switched on or switched off, and an internal resistor $R_{PRG}$ 559 that is re-programmable. In a normal operation mode, the calibration module 570 is switched off, and the internal resistor $R_{PRG}$ 559 has a fixed resistance, and the pre-amplifier 520 operates similarly to the pre-amplifier 220. In the calibration mode, the calibration module 570 is switched on to receive the voltage Vo and adjust the internal resistor $R_{PRG}$ 559 based on the voltage Vo. In an example, the internal resistor $R_{PRG}$ is adjusted to make the voltage Vo to be zero. For example, the internal resistor $R_{PRG}$ 559 is initially to have a relatively large resistance that is certainly larger than the $R_{MR}$, then the calibration module 570 reduces the resistance of the internal resistor $R_{PRG}$ 559 until the voltage Vo is substantially equal to zero. In an embodiment, when the voltage Vo is equal to zero, the calibration module 570 is then switched off, and the internal resistor $R_{PRG}$ 559 is fixed at the resistance that can provide the appropriate bias currents to the amplifier portion. It is noted that, in an embodiment, the internal resistor $R_{PRG}$ 559 is adjusted to absorb any errors in the pre-amplifier 520. Thus, in an example, the error correction value in FIG. 2 is not needed.

In an embodiment, the calibration module 570 includes a comparator configured to determine a polarity of the voltage Vo, and adjust the internal resistor $R_{PRG}$ 559 based on the determined polarity.

Figure 6:
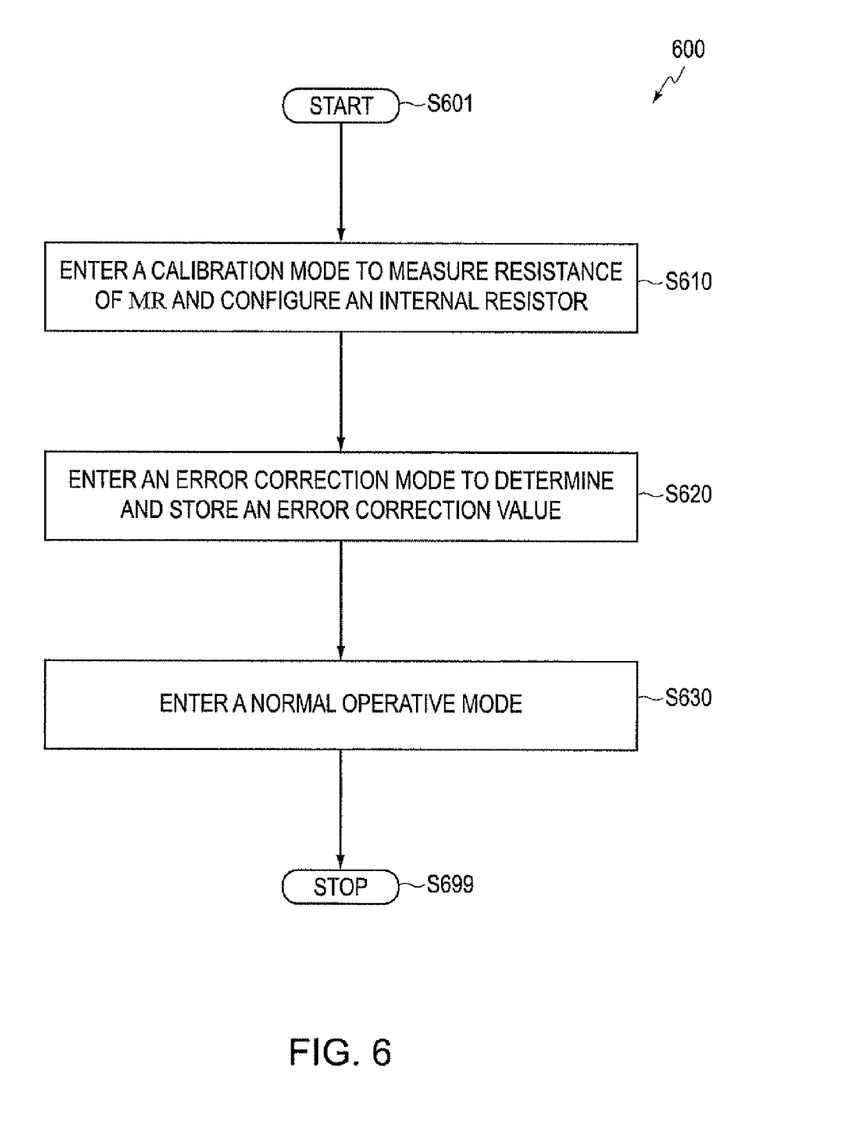
FIG. 6 shows a flow chart outlining a process example 600 according to an embodiment of the disclosure.

FIG. 6 shows a flow chart outlining a process example 600 for a system, such as the HDD system 100, to calibrate and operate according an embodiment of the disclosure. The process starts at S601, and proceeds to S610.

At S610, the system 100 enters a calibration mode to configure the internal resistor $R_{INT}$ 159 according to the resistance of the $R_{MR}$ 119. In an example, the internal resistor $R_{INT}$ 159 is one time programmable. In the calibration mode, the $R_{MR}$ 119 is coupled to another resistance measuring apparatus to measure the resistance, and then the internal resistor $R_{INT}$ 159 is programmed according to the measured resistance.

In another example, such as the pre-amplifier 520 in FIG. 5, the pre-amplifier 520 includes the internal resistor $R_{PRG}$ 559 that is re-programmable. In the calibration mode, the calibration module 570 is switched on, and adjusts the internal resistor $R_{PRG}$ 559 based on the voltage Vo, such that the voltage Vo is substantially equal to zero. In an embodiment, when the calibration module 570 is switched on, the calibration module and the rest of the pre-amplifier circuit 520 form a feedback loop to gradually adjust the internal resistor $R_{PRG}$ 559 until the voltage Vo is substantially equal to zero. Then the calibration module 570 is switched off.

At S620, the HDD system 100 enters an error correction mode to determine and store an error correction value. In an example, in the error correction mode, bias voltages and bias currents are provided to the $R_{MR}$ 119 based on the internal resistor $R_{INT}$ 159, then the voltage Vo is measured, and the error correction value is determined based on the voltage Vo and is stored in a memory.

In another example, such as the pre-amplifier 220 in FIG. 2, in the error correction mode, an error correction controller (not shown) is switched on, and an initial error correction value is provided to the pre-amplifier 220. The bias voltages V1 and V2 are generated based on a digital input, the bias voltages V1' and V2' are generated based on the digital input and the error correction value. The bias currents IB1 and IB2 are generated based on the bias voltages V1' and V2' and the internal resistor $R_{INT}$ 259. Then, the error correction controller adjusts the error correction value based on the voltage Vo, such that the voltage Vo is substantially equal to zero. Then, the error correction controller is switched off.

At S630, the HDD system 100 enters the normal operation mode. In an example, in the normal operation mode, the calibration module and the error correction controller are switched off. Then the process proceeds to S699 and terminates.

It is noted that the process 600 can be suitable modified. In an example, the calibration step S610 is not necessary, and is skipped. In another example, the error correction step S620 is not necessary, and is skipped.

Figure 7:
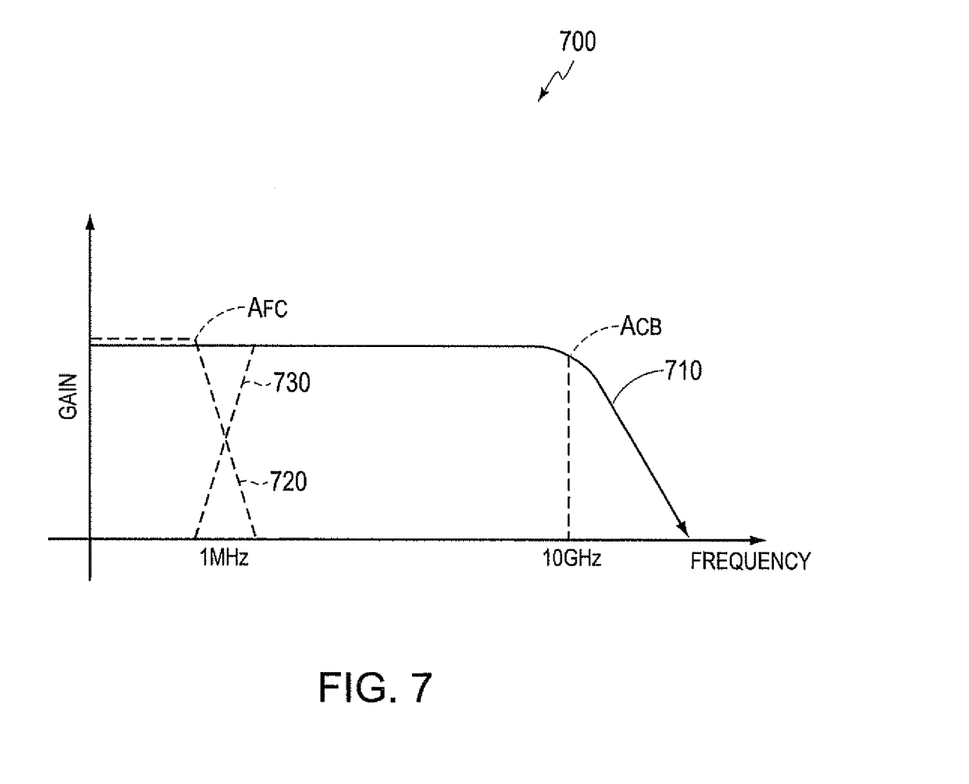
FIG. 7 shows a frequency response plot 700 according to an embodiment of the disclosure.

FIG. 7 shows a frequency response plot 700 according to an embodiment of the disclosure. The frequency response plot 700 includes a first frequency response 710 corresponding to a frequency response of a common base amplifier in an open loop configuration, such as the pre-amplifier 220. The common base amplifier in the open loop configuration is a wideband amplifier. The frequency response plot 700 also includes a second frequency response 720 corresponding a frequency response of a generally used feedback amplifier. The feedback amplifier is a low pass amplifier, and the bandwidth is generally affected by a capacitor coupled to the feedback amplifier. The frequency response plot 700 also includes a third frequency response 730 corresponding to a frequency response of a common base amplifier in a close loop configuration. In an example, the pre-amplifier 220 can be coupled to a feedback amplifier to form a close loop to adjust the bias voltage and/or the bias current in order to bias the pre-amplifier 220 at a specific operation point. The common base amplifier in the close loop configuration is a band pass amplifier.

While the invention has been described in conjunction with the specific embodiments thereof that are proposed as examples, it is evident that many alternatives, modifications, and variations will be apparent to those skilled in the art. Accordingly, embodiments of the invention as set forth herein are intended to be illustrative, not limiting. There are changes that may be made without departing from the scope of the invention.

What is claimed is:

1. A circuit, comprising:
    a biasing circuit configured to generate a bias voltage and a bias current, where the bias voltage and the bias current are based on a first resistor having a first resistance determined based on a second resistor; and
    an amplifier biased based on the bias voltage and bias current to generate an electrical signal that varies in response to a resistance change of the second resistor.

2. The circuit of claim 1, wherein the biasing circuit further comprises:
    a bias voltage generator configured to generate the bias voltage based on a user input; and
    a bias current generator configured to generate the bias current based on the bias voltage and the first resistor.

3. The circuit of claim 1, wherein the biasing circuit further comprises:
    a bias current generator configured to generate the bias current based on a user input; and
    a bias voltage generator configured to generate the bias voltage based on the bias current and the first resistor.

4. The circuit of claim 1, further comprising:
    the first resistor configured to be programmable.

5. The circuit of claim 4, wherein
    the biasing circuit is configured to generate at least one of the bias voltage based on a voltage drop on the first resistor, and the bias current based on a current flowing through the first resistor.

6. The circuit of claim 4, further comprising:
    a calibration circuit to be switched on in a calibration mode to determine the first resistance based on the electrical signal.

7. The circuit of claim 6, wherein:
    the first resistor is re-programmable; and
    the calibration circuit is configured to program the first resistor based on the electrical signal.

8. The circuit of claim 4, wherein the circuit is implemented as an integrated circuit, and the second resistor is external to the integrated circuit.

9. The circuit of claim 1, wherein
    a memory is configured to store an error correction value; and
    the biasing circuit is configured to generate the bias voltage and the bias current based on the first resistor and the error correction value.

10. The circuit of claim 1, wherein the amplifier is a differential common base amplifier.

11. A method, comprising:
    generating a bias voltage and a bias current, where the bias voltage and the bias current are based on a first resistor having a first resistance determined based on a second resistor;
    biasing an amplifier based on the bias voltage and bias current; and
    generating an electrical signal that varies a voltage in response to a resistance change of the second resistor.

12. The method of claim 11, wherein generating the bias voltage and the bias current based on the first resistor further comprises:
    generating the bias voltage based on a user input; and
    generating the bias current based on the bias voltage and the first resistor.

13. The method of claim 11, wherein generating the bias voltage and the bias current based on the first resistor further comprises:
    generating the bias current based on a user input; and
    generating the bias voltage based on the bias current and the first resistor.

14. The method of claim 11, further comprising:
    measuring a second resistance of the second resistor; and
    configuring the first resistor based on the measured second resistance.

15. The method of claim 11, further comprising:
    switching on a calibration circuit to adjust the first resistance based on the voltage of the electrical signal.

16. The method of claim 11, further comprising:
    storing an error correction value;
    generating the bias voltage and the bias current based on the first resistor and the error correction value.

17. A hard disk drive system, comprising:
    a magneto resistive sensor configured to have a resistance that varies in response to a magnetic field; and
    a circuit comprising:
        a biasing circuit configured to generate a bias voltage and a bias current, where the bias voltage and the bias current are based on an internal resistor calibrated to match the resistance of the magneto resistive sensor; and
        an amplifier biased based on the bias voltage and the bias current to generate an electrical signal that varies in response to the resistance change of the magneto resistive sensor.

18. The hard disk drive system of claim 17, wherein:
    the internal resistor is re-programmable; and
    a calibration circuit is switched on in a calibration mode to program the internal resistor based on the voltage of the electrical signal.

19. The hard disk drive system of claim 17, wherein
    a memory is configured to store an error correction value; and
    the biasing circuit is configured to generate the bias voltage and the bias current based on the first resistor and the error correction value.

20. The hard disk drive system of claim 17, wherein the amplifier is a differential common base amplifier.

* * * * *